United States Patent
Harel et al.

(10) Patent No.: US 9,313,805 B2
(45) Date of Patent: *Apr. 12, 2016

(54) SYSTEM AND METHOD FOR SIMULTANEOUS CO-CHANNEL ACCESS OF NEIGHBORING ACCESS POINTS

(71) Applicant: Magnolia Broadband Inc., Englewood, NJ (US)

(72) Inventors: Haim Harel, New York, NY (US); Stuart S. Jeffery, Los Altos, CA (US); Phil F. Chen, Denville, NJ (US); Sherwin J. Wang, Towaco, NJ (US); Kenneth Kludt, San Jose, CA (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,634

(22) Filed: Mar. 30, 2015

(65) Prior Publication Data

US 2015/0264717 A1 Sep. 17, 2015

Related U.S. Application Data

(63) Continuation of application No. 14/297,898, filed on Jun. 6, 2014, now Pat. No. 8,995,416.

(60) Provisional application No. 61/946,391, filed on Feb. 28, 2014, provisional application No. 61/844,750, (Continued)

(51) Int. Cl.
*H04W 74/08* (2009.01)
*H04L 5/00* (2006.01)
(Continued)

(52) U.S. Cl.
CPC ........ *H04W 74/0816* (2013.01); *H04L 5/0055* (2013.01); *H04W 8/005* (2013.01); *H04W 48/20* (2013.01); *H04W 76/02* (2013.01); *H04W 84/12* (2013.01); *H04W 88/08* (2013.01)

(58) Field of Classification Search
CPC ................................. H04W 74/0816
USPC ......... 370/208, 252, 295, 310, 328, 334, 338; 375/264, 267, 299
See application file for complete search history.

(56) References Cited

U.S. PATENT DOCUMENTS 4,044,359 A 8/1977 Applebaum et al.
4,079,318 A 3/1978 Kinoshita
(Continued)

FOREIGN PATENT DOCUMENTS

EP 1 189 303 3/2002
EP 1 867 177 5/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Andrew Lai
*Assistant Examiner* — Andrew C Lee
(74) *Attorney, Agent, or Firm* — Pearl Cohen Zedek Latzer Baratz LLP

(57) ABSTRACT

A system and method for overriding Carrier-Sense-Multiple-Access/Collision-Avoidance (CSMA/CA) and virtual carrier sense, without harming the traffic that occupies the channel is described herein. Further provided herein are measurements and qualifying criteria for performing the aforementioned channel sharing. The system and method may be based, for example, on opportunistic spatial isolation of nodes from each other and selectively implementing ultra-fast link adaptation.

25 Claims, 12 Drawing Sheets

Related U.S. Application Data filed on Jul. 10, 2013, provisional application No. 61/845,271, filed on Jul. 11, 2013, provisional application No. 61/861,572, filed on Aug. 2, 2013, provisional application No. 61/876,886, filed on Sep. 13, 2013, provisional application No. 61/877,012, filed on Sep. 12, 2013.

(51) Int. Cl.
*H04W 48/20* (2009.01)
*H04W 76/02* (2009.01)
*H04W 8/00* (2009.01)
*H04W 84/12* (2009.01)
*H04W 88/08* (2009.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,834,073 B1 | 12/2004 | Miller et al. | |
| 6,842,460 B1* | 1/2005 | Olkkonen et al. | 370/465 |
| 6,914,890 B1 | 7/2005 | Tobita et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,904,086 B2 | 3/2011 | Kundu et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,115,679 B2 | 2/2012 | Falk | |
| 8,155,613 B2 | 4/2012 | Kent et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2* | 3/2014 | Kloper et al. | 455/63.1 |
| 8,744,511 B2 | 6/2014 | Jones et al. | |
| 8,767,862 B2 | 7/2014 | Abreu et al. | |
| 8,780,743 B2 | 7/2014 | Sombrutzki et al. | |
| 8,942,134 B1 | 1/2015 | Kludt et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1* | 12/2002 | Sherman | 370/338 |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1* | 5/2006 | Lyons et al. | 370/338 |
| 2006/0094372 A1 | 5/2006 | Ahn et al. | |
| 2006/0098605 A1 | 5/2006 | Li | |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |

(56) References Cited

U.S. PATENT DOCUMENTS

| | | | |
|---|---|---|---|
| 2006/0285507 A1 | 12/2006 | Kinder et al. | |
| 2007/0041398 A1* | 2/2007 | Benveniste | 370/448 |
| 2007/0058581 A1* | 3/2007 | Benveniste | 370/328 |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115882 A1 | 5/2007 | Wentink | |
| 2007/0115914 A1 | 5/2007 | Ohkubo et al. | |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2007/0249386 A1 | 10/2007 | Bennett | |
| 2008/0043867 A1 | 2/2008 | Blanz et al. | |
| 2008/0051037 A1 | 2/2008 | Molnar et al. | |
| 2008/0081671 A1 | 4/2008 | Wang et al. | |
| 2008/0095163 A1 | 4/2008 | Chen et al. | |
| 2008/0108352 A1 | 5/2008 | Montemurro et al. | |
| 2008/0125120 A1 | 5/2008 | Gallagher et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0240314 A1* | 10/2008 | Gaal et al. | 375/346 |
| 2008/0267142 A1 | 10/2008 | Mushkin et al. | |
| 2008/0280571 A1 | 11/2008 | Rofougaran et al. | |
| 2008/0285637 A1 | 11/2008 | Liu et al. | |
| 2009/0003299 A1* | 1/2009 | Cave et al. | 370/338 |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1* | 5/2009 | Sherman et al. | 455/41.2 |
| 2009/0154419 A1 | 6/2009 | Yoshida et al. | |
| 2009/0187661 A1 | 7/2009 | Sherman | |
| 2009/0190541 A1 | 7/2009 | Abedi | |
| 2009/0227255 A1 | 9/2009 | Thakare | |
| 2009/0239486 A1 | 9/2009 | Sugar et al. | |
| 2009/0268616 A1 | 10/2009 | Hosomi | |
| 2009/0285331 A1 | 11/2009 | Sugar et al. | |
| 2009/0322610 A1 | 12/2009 | Hants et al. | |
| 2009/0322613 A1 | 12/2009 | Bala et al. | |
| 2009/0323608 A1 | 12/2009 | Adachi et al. | |
| 2010/0002656 A1 | 1/2010 | Ji et al. | |
| 2010/0037111 A1 | 2/2010 | Ziaja et al. | |
| 2010/0040369 A1 | 2/2010 | Zhao et al. | |
| 2010/0067473 A1* | 3/2010 | Cave et al. | 370/329 |
| 2010/0111039 A1 | 5/2010 | Kim et al. | |
| 2010/0117890 A1 | 5/2010 | Vook et al. | |
| 2010/0135420 A1 | 6/2010 | Xu et al. | |
| 2010/0150013 A1 | 6/2010 | Hara et al. | |
| 2010/0172429 A1 | 7/2010 | Nagahama et al. | |
| 2010/0195560 A1 | 8/2010 | Nozaki et al. | |
| 2010/0195601 A1 | 8/2010 | Zhang | |
| 2010/0208712 A1 | 8/2010 | Wax et al. | |
| 2010/0222011 A1 | 9/2010 | Behzad | |
| 2010/0232355 A1 | 9/2010 | Richeson et al. | |
| 2010/0234071 A1 | 9/2010 | Shabtay et al. | |
| 2010/0278063 A1* | 11/2010 | Kim et al. | 370/252 |
| 2010/0283692 A1 | 11/2010 | Achour et al. | |
| 2010/0285752 A1 | 11/2010 | Lakshmanan et al. | |
| 2010/0291931 A1 | 11/2010 | Suemitsu et al. | |
| 2010/0303170 A1 | 12/2010 | Zhu et al. | |
| 2010/0316043 A1 | 12/2010 | Doi et al. | |
| 2011/0019639 A1 | 1/2011 | Karaoguz et al. | |
| 2011/0032849 A1 | 2/2011 | Yeung et al. | |
| 2011/0032972 A1 | 2/2011 | Wang et al. | |
| 2011/0085465 A1 | 4/2011 | Lindoff et al. | |
| 2011/0085532 A1 | 4/2011 | Scherzer et al. | |
| 2011/0105036 A1 | 5/2011 | Rao et al. | |
| 2011/0116489 A1* | 5/2011 | Grandhi | 370/338 |
| 2011/0134816 A1 | 6/2011 | Liu et al. | |
| 2011/0150050 A1 | 6/2011 | Trigui et al. | |
| 2011/0150066 A1 | 6/2011 | Fujimoto | |
| 2011/0151826 A1 | 6/2011 | Miller et al. | |
| 2011/0163913 A1 | 7/2011 | Cohen et al. | |
| 2011/0205883 A1 | 8/2011 | Mihota | |
| 2011/0205998 A1 | 8/2011 | Hart et al. | |
| 2011/0228742 A1 | 9/2011 | Honkasalo et al. | |
| 2011/0249576 A1 | 10/2011 | Chrisikos et al. | |
| 2011/0250884 A1 | 10/2011 | Brunel et al. | |
| 2011/0273977 A1 | 11/2011 | Shapira et al. | |
| 2011/0281541 A1 | 11/2011 | Borremans | |
| 2011/0299437 A1 | 12/2011 | Mikhemar et al. | |
| 2011/0310827 A1 | 12/2011 | Srinivasa et al. | |
| 2011/0310853 A1 | 12/2011 | Yin et al. | |
| 2012/0014377 A1 | 1/2012 | Joergensen et al. | |
| 2012/0015603 A1 | 1/2012 | Proctor et al. | |
| 2012/0020396 A1 | 1/2012 | Hohne et al. | |
| 2012/0027000 A1 | 2/2012 | Wentink | |
| 2012/0028638 A1 | 2/2012 | Mueck et al. | |
| 2012/0028655 A1 | 2/2012 | Mueck et al. | |
| 2012/0028671 A1 | 2/2012 | Niu et al. | |
| 2012/0033761 A1 | 2/2012 | Guo et al. | |
| 2012/0034952 A1 | 2/2012 | Lo et al. | |
| 2012/0045003 A1 | 2/2012 | Li et al. | |
| 2012/0051287 A1 | 3/2012 | Merlin et al. | |
| 2012/0064838 A1 | 3/2012 | Miao et al. | |
| 2012/0069828 A1 | 3/2012 | Taki et al. | |
| 2012/0076028 A1* | 3/2012 | Ko et al. | 370/252 |
| 2012/0076229 A1 | 3/2012 | Brobston et al. | |
| 2012/0088512 A1 | 4/2012 | Yamada et al. | |
| 2012/0092217 A1 | 4/2012 | Hosoya et al. | |
| 2012/0100802 A1 | 4/2012 | Mohebbi | |
| 2012/0115523 A1 | 5/2012 | Shpak | |
| 2012/0155349 A1 | 6/2012 | Bajic et al. | |
| 2012/0155397 A1 | 6/2012 | Shaffer et al. | |
| 2012/0163257 A1 | 6/2012 | Kim et al. | |
| 2012/0163302 A1 | 6/2012 | Takano | |
| 2012/0170453 A1 | 7/2012 | Tiwari | |
| 2012/0170672 A1 | 7/2012 | Sondur | |
| 2012/0201153 A1 | 8/2012 | Bharadia et al. | |
| 2012/0201173 A1 | 8/2012 | Jain et al. | |
| 2012/0207256 A1 | 8/2012 | Farag et al. | |
| 2012/0212372 A1 | 8/2012 | Petersson et al. | |
| 2012/0213065 A1 | 8/2012 | Koo et al. | |
| 2012/0218962 A1 | 8/2012 | Kishiyama et al. | |
| 2012/0220331 A1 | 8/2012 | Luo et al. | |
| 2012/0230380 A1 | 9/2012 | Keusgen et al. | |
| 2012/0251031 A1 | 10/2012 | Suarez et al. | |
| 2012/0270531 A1 | 10/2012 | Wright et al. | |
| 2012/0270544 A1 | 10/2012 | Shah | |
| 2012/0281598 A1 | 11/2012 | Struhsaker et al. | |
| 2012/0314570 A1 | 12/2012 | Forenza et al. | |
| 2012/0321015 A1* | 12/2012 | Hansen et al. | 375/295 |
| 2012/0327870 A1 | 12/2012 | Grandhi et al. | |
| 2013/0010623 A1 | 1/2013 | Golitschek | |
| 2013/0017794 A1* | 1/2013 | Kloper et al. | 455/63.1 |
| 2013/0023225 A1 | 1/2013 | Weber | |
| 2013/0044877 A1 | 2/2013 | Liu et al. | |
| 2013/0051283 A1 | 2/2013 | Lee et al. | |
| 2013/0058239 A1 | 3/2013 | Wang et al. | |
| 2013/0070741 A1 | 3/2013 | Li et al. | |
| 2013/0079048 A1* | 3/2013 | Cai et al. | 455/517 |
| 2013/0094437 A1 | 4/2013 | Bhattacharya | |
| 2013/0094621 A1 | 4/2013 | Luo et al. | |
| 2013/0095780 A1 | 4/2013 | Prazan et al. | |
| 2013/0101073 A1 | 4/2013 | Zai et al. | |
| 2013/0150012 A1 | 6/2013 | Chhabra et al. | |
| 2013/0156016 A1 | 6/2013 | Debnath et al. | |
| 2013/0156120 A1 | 6/2013 | Josiam et al. | |
| 2013/0170388 A1 | 7/2013 | Ito et al. | |
| 2013/0172029 A1 | 7/2013 | Chang et al. | |
| 2013/0190006 A1 | 7/2013 | Kazmi et al. | |
| 2013/0208587 A1* | 8/2013 | Bala et al. | 370/230 |
| 2013/0208619 A1 | 8/2013 | Kudo et al. | |
| 2013/0223400 A1* | 8/2013 | Seo et al. | 370/329 |
| 2013/0229996 A1 | 9/2013 | Wang et al. | |
| 2013/0229999 A1 | 9/2013 | Da Silva et al. | |
| 2013/0235720 A1* | 9/2013 | Wang et al. | 370/229 |
| 2013/0242853 A1 | 9/2013 | Seo et al. | |
| 2013/0242899 A1 | 9/2013 | Lysejko et al. | |
| 2013/0242965 A1 | 9/2013 | Horn et al. | |
| 2013/0242976 A1 | 9/2013 | Katayama et al. | |
| 2013/0252621 A1 | 9/2013 | Dimou et al. | |
| 2013/0272437 A1 | 10/2013 | Eidson et al. | |

(56) References Cited

U.S. PATENT DOCUMENTS

| | | | |
|---|---|---|---|
| 2013/0301551 A1* | 11/2013 | Ghosh et al. | 370/329 |
| 2013/0331136 A1 | 12/2013 | Yang et al. | |
| 2013/0343369 A1 | 12/2013 | Yamaura | |
| 2014/0010089 A1* | 1/2014 | Cai et al. | 370/241 |
| 2014/0010211 A1 | 1/2014 | Asterjadhi et al. | |
| 2014/0029433 A1 | 1/2014 | Wentink | |
| 2014/0071873 A1* | 3/2014 | Wang et al. | 370/311 |
| 2014/0086077 A1 | 3/2014 | Safavi | |
| 2014/0086081 A1 | 3/2014 | Mack et al. | |
| 2014/0098681 A1 | 4/2014 | Stager et al. | |
| 2014/0119288 A1 | 5/2014 | Zhu et al. | |
| 2014/0154992 A1 | 6/2014 | Silverman et al. | |
| 2014/0185501 A1 | 7/2014 | Park et al. | |
| 2014/0185535 A1 | 7/2014 | Park et al. | |
| 2014/0192820 A1 | 7/2014 | Azizi et al. | |
| 2014/0204821 A1 | 7/2014 | Seok et al. | |
| 2014/0241182 A1 | 8/2014 | Smadi | |
| 2014/0307653 A1 | 10/2014 | Liu et al. | |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.

(56) References Cited

OTHER PUBLICATIONS

Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, no. Ljubljana; 20090107, Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, no. Valencia, Spain; 20100118, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.

* cited by examiner

SYSTEM AND METHOD FOR SIMULTANEOUS CO-CHANNEL ACCESS OF NEIGHBORING ACCESS POINTS

CROSS-REFERENCE TO RELATED APPLICATIONS

This application is a continuation application of U.S. patent application Ser. No. 14/297,898 filed on Jun. 6, 2014, now U.S. Pat. No. 8,995,416, issued on Mar. 31, 2015, which claims benefit from U.S. Provisional Patent Application Ser. Nos. 61/946,391 filed on Feb. 28, 2014, 61/844,750 filed on Jul. 10, 2013, 61/845,271 filed on Jul. 11, 2013, 61/861,572 filed on Aug. 2, 2013, 61/876,886 filed on Sep. 12, 2013, and 61/877,012 filed on Sep. 12, 2013, each of which are incorporated herein by reference in their entirety.

FIELD OF THE INVENTION

The present invention relates generally to wireless communication, and more specifically to high efficiency Wi-Fi.

BACKGROUND OF THE INVENTION

Prior to setting forth the background of the invention, it may be helpful to set forth definitions of certain terms that will be used hereinafter.

The term "Wi-Fi" as used herein is defined as any wireless local area network (WLAN) products that are based on the Institute of Electrical and Electronics Engineers (IEEE) 802.11 standards.

The term "Access Point" or "AP" as used herein is defined as a device that allows wireless devices (also known as User Equipment or "UE") to connect to a wired network using Wi-Fi, or related standards. The AP usually connects to a router (via a wired network) as a standalone device, but it can also be an integral component of the router itself.

The term "client" as used herein is defined as any device that has wireless communication capabilities, specifically, the IEEE 802.11 standards. A client may be for example a smart telephone, a laptop, a tablet or a personal computer (PC).

The notation "STA" as used herein is defined in as an IEEE 802.11 client.

The term "node" as used herein is defined as general name for both IEEE 802.11 AP and IEEE 802.11 STA.

The term "serving AP" as used herein is defined in relation to one AP and one STA, wherein the STA is registered to said AP, and said AP and STA are sending and receiving data to and from each other.

The term "neighboring APs", nodes or devices may include two (or more) co-frequency APs, nodes or devices that are within each other's sensitivity range, e.g. at least one of them can receive signals from the other in such as signal-to-noise ratio that allows decoding of signals.

The term "clear channel assessment range" or "CCA range" as used herein is a range between two IEEE 802.11 nodes, wherein at least one node can receive the other's transmission at a power level equal or larger than −82 dBm.

The term "CSMA/CA" stands for Carrier-Sense-Multiple-Access/Collision-Avoidance, representing a requirement to listen before transmitting in a multi-node wireless system that shares a common channel on the basis of first-come-first-served.

The term "preamble" as used herein describes a certain 802.11 transmitted signal modulation appearing at the beginning of each packet, that when received by other 802.11 nodes, will force them to yield channel access.

The notation "SINR" stands for Signal-to-Noise and Interference.

The term "ACK" as used herein, stands for acknowledgement or an acknowledgement signal, as for example defined as the signal transmitted from an IEEE 802.11 receiving node to the IEEE 802.11 node that has transmitted a packet to it, provided the packet was successfully received.

The term "time division duplex" (TDD) as used herein is referred to in general for systems using the same frequency spectrum for methods of communications in a time division manner such as Wi-Fi systems.

Implicit feedback is a process used for TDD protocols such as Wi-Fi, where both down and up links share the same spectrum. In the aforementioned process, the uplink channel estimated by the AP, is assumed to be identical to the downlink one—based on reciprocity principle—and is therefore is considered by the AP to represent the channel towards the client/STA Explicit feedback is a procedure where AP transmissions are channel estimated by the STA, and then fed back to the AP, providing it with the magnitude of phase and amplitude differences between the signals as transmitted by the AP vis-à-vis as received by the client/STA, allowing it to gauge possible distortions and correct them.

The term "Legacy Long Training Field" (L-LTF) denotes a field within the IEEE 802.11 Preamble name.

The term "Very-High-Throughput Long Training Field" (VHT-LTF) denotes a field within the IEEE 802.11 Preamble name Very-High-Throughput Long Training Field.

Associated STA is defined herein as a STA that is served by a certain AP with a certain Service Set Identifier (SSID).

Non-associated STA is defined herein as a STA within the range of and non-serving AP and/or its non-serving STAs.

The acronym "NAV" stands for Network-Allocation-Vector and represents virtual carrier sense mechanism, used by a Wi-Fi transmitting message to broadcast the predicted duration of its transmission, signaling to other nodes how long will the channel be occupied The acronym "RTS" stands for Request-To-Send, and represents a message transmitted by one Wi-Fi node to another, probing it for information about its availability to receive data, per the Wi-Fi Alliance protocol.

The acronym "CTS" stands for Clear-To-Send, and represents a positive response from the said other node to the node originating the RTS, indicating to the requesting node that the channel is clear from its point of view as well.

The notation "DURATION" is a message embedded in both RTS and CTS, representing a prediction of the future traffic about to be transmitted between two nodes that have captured the channel; other nodes that receive it, must clear the channel as long as the DURATION has nor expired; other nodes that have received the RTS but received the CTS (hidden nodes) will avoid accessing the channel, allowing the receiving node to successfully complete the reception.

The acronym "FLA" stands for Fast Link Adaptation, and represents processed that reduce transmitting side learning time of the receiver's SINR.

The acronym "MCS" stands for Modulation Coding Scheme, mapping SINR to modulation order and code rate.

The acronym "MRQ" stands for MCS request (Modulation Code Scheme Request).

The acronym "MSI" stands for MRQ Sequence Identifier, which carries MCS feedback from receiver to transmitter.

The term "null" as used herein, is a spatial pattern, created by two or more antennas, formed in such a way that minimizes the power level received by a given receiver. A "Rx Null" is a null formed by a receiver's antennas weight in order to decrease undesired signal level. A "Tx Null" is formed by a transmitter's antennas weights in order to decrease its undesired transmitted signal at remote receiver's input.

The term "nulling AP" as used herein, is a station (client) that is equipped with nulling capabilities.

The term "nulled AP" as used herein is an Access Point within CCA from a Nulling STA.

The term "neighbors list" as used herein is a list of neighboring APs and STAs within CCA range which keeps history to be checked.

The term "close neighbors" as used herein are subgroups in the Neighbors' list that are within each other's CCA range.

According to the IEEE 802.11 air protocol, two neighboring APs can download traffic over the same frequency channel to their respective STAs, as long as these APs are not within CCA range of each other.

When an RTS/CTS procedure is used, an additional condition is introduced. Namely, a legacy AP serving a respective station, must not be within CCA range of the other neighboring AP if the AP is occupying the channel.

SUMMARY OF THE INVENTION

Embodiments of the invention provide a method of overriding CSMA-CA and virtual carrier sense, without harming the traffic that occupies the channel, together with measurements and qualifying criteria for performing said simultaneous channel sharing. Embodiments of the invention are based on opportunistic spatial isolation of nodes from each other and selectively implementing ultra-fast link adaptation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

DETAILED DESCRIPTION OF THE INVENTION

Figure 1A:
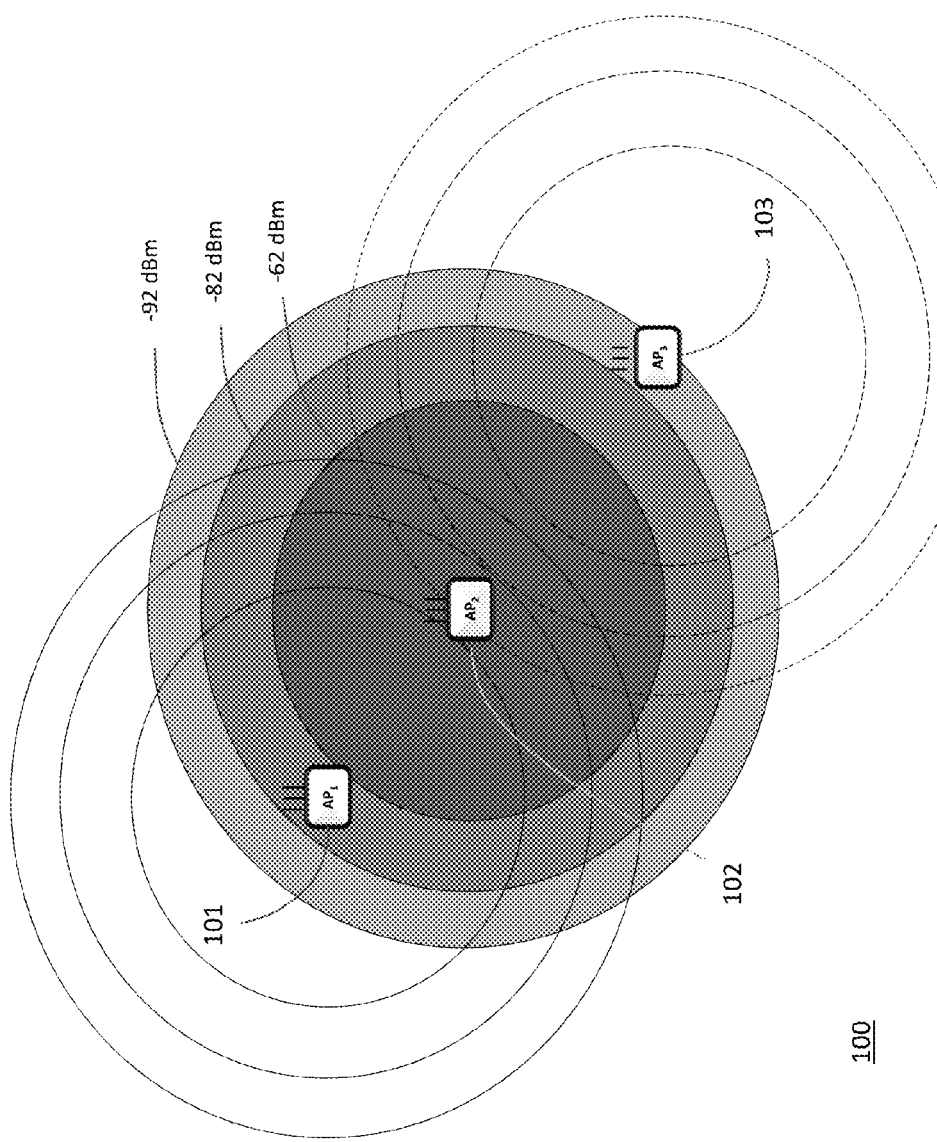
FIG. 1A is a block diagram illustrating co-channel legacy APs deployment in accordance with the prior art.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The distributed nature of 802.11 channel access protocol facilitated lowering of usage barriers and contributed to its enormous success; some of deficiencies that come along with the protocol's binary co-existence code of conduct, are recently being readdressed by IEEE efforts to introduce physical layer (PHY) and Media Access Control (MAC) enhancements that will increase spatial capacity; this invention focuses on some scenarios where novel spatial isolation of signaling between adjacent nodes may allow them to use same channel for simultaneous data transmissions.

According to the 802.11 air protocol, two adjacent APs are exchanging traffic over the same frequency channel with one of its STAs, as long as none of the STAs-APs pairs are with in CCA range of each other; once two transmitting nodes are within CCA range, simultaneous channel access is prohibited.

In one embodiment, two adjacent APs that are within CCA range of each other may transmit downlink streams to served STAs, as long as these STAs are outside the CCA range of the non-serving AP. This may be made possible for example by one AP tuning a 2-way spatial null towards or in the direction of the other AP.

It is noted that during the time period in which both APs are transmitting, there is no need to protect one from the other's signal; the said nulls relevant when the one AP transmits while the other receives;

In one embodiment scenario, if an AP is receiving ACK from its STA while the other is transmitting at CCA range, jamming must be avoided, so the nulling AP must protect both it's own ACK reception, as well as the other AP's ACK reception, by applying a Tx null as well as a Rx null towards the other AP;

In the aforementioned scenario, if an AP contemplating accessing a channel occupied by another AP is using an RTS/CTS procedure, then the RTS must not be allowed to interfere with a possible ACK arriving at that time, and the CTS must be protected from being jammed by the neighboring AP, so again, a TX and a Rx nulls are applied.

FIG. 1A depicts an example of 3 adjacent APs, where $AP_1$ and $AP_2$ (101, 102 respectively) are within the CCA range of each other, meaning that one's transmission are received by the other at power level higher than −82 dBm, thus requiring them to yield to each other's preamble; additionally, $AP_1$'s other neighbor $AP_3$, is outside the CCA range. Thus this pair can access the channel simultaneously, yet not without mutual interference as their receivers experience different boundaries with and without the other's activity. E.g. when $AP_3$ is silent, $AP_2$ may be bounded by AWGN (~92 dBm in typical Node), while when $AP_3$ transmits, the boundary will be lower (somewhere between −82 and −92 dBm). Note that such uncertainty, if not accounted for by the link adaptation, may cause an uplink transmission to become un-decodable.

Figure 1B:
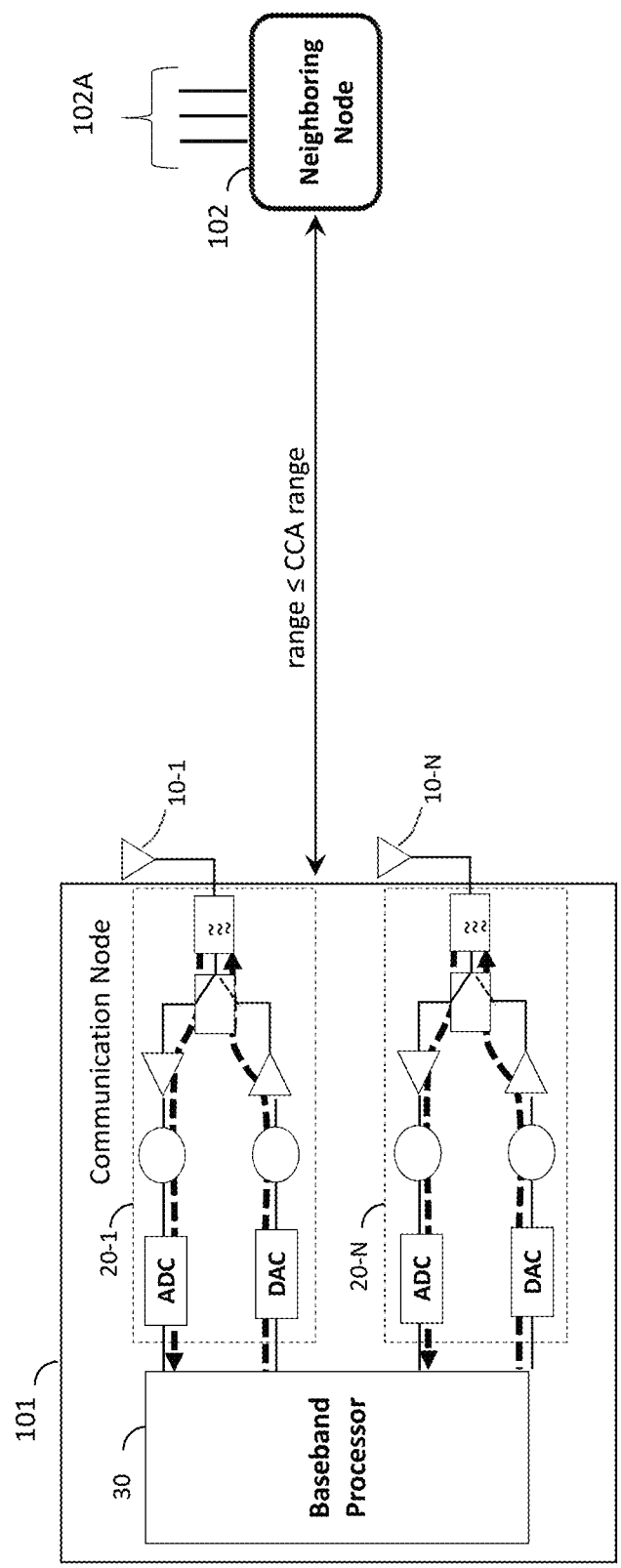
FIG. 1B is a block diagram illustrating a communication node within CCA range of a neighboring node, in accordance with some embodiments of the present invention.

FIG. 1B is a block diagram illustrating a communication node 101 within CCA range of a neighboring node 102 having one or more antennas 102A, in accordance with some embodiments of the present invention. Communication node 101 may include: a plurality of antennas 10-1 to 10-N; a plurality of radio circuits 20-1 to 20-N configured to transmit and receive in compliance with IEEE 802.11 standard; and a baseband processor 30.

In operation, communication node 101 is configured to transmit and receive signals within a clear channel assessment (CCA) range of a number N neighboring nodes sharing a co-channel and further communicating in compliance with the IEEE 802.11 standard.

In operation, baseband processor 30 may be configured to set weights on radio circuits 20-1 to 20-N such that spatial signatures are generated in both downlink and uplink streams or transmissions (the uplink may be define as the direction from the AP to the STA and the uplink being the direction from the STA to the AP) in a way that isolates the communication node from at least one of the N neighboring nodes, in a manner that allows said communication node to access said co-channel, known or recognized by said communication node to be currently used by at least one of the N neighboring nodes, while keeping the transmitted signal level of the communication node as received by said N neighboring nodes, below the CCA signal level. According to some embodiments of the present invention, communication node is a nulling AP and the neighboring nodes are nulled APs, and wherein the APs communicate in compliance with the 802.11 standard. The nulling may be created by the nulling AP, are in both downlink and uplink toward or in the direction of the nulled APs.

Figure 2:
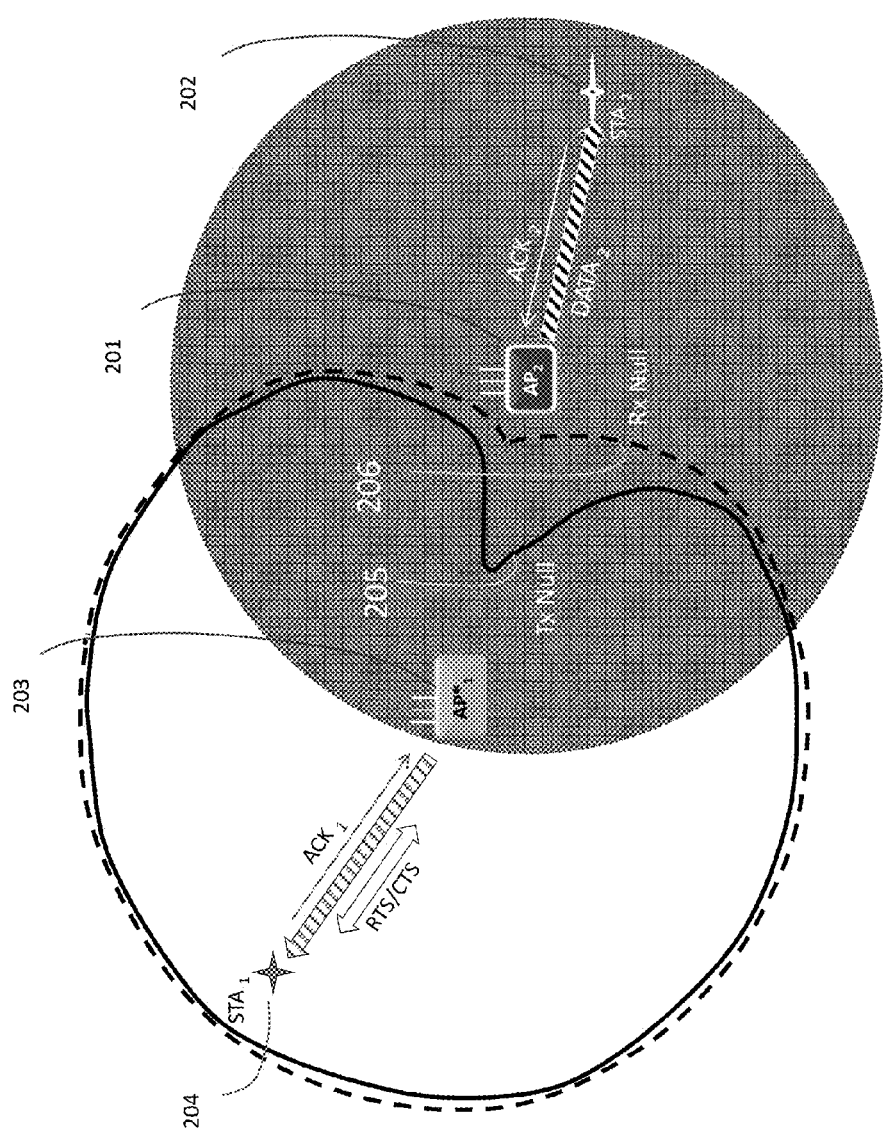
FIG. 2 is an example of a modified AP turning a two-way null towards a co-channel AP outside immediate CSMA range in accordance with some embodiments of the present invention.

FIG. 2 depicts two APs within CCA range, where $AP_2$ (201) is a legacy AP (e.g. older IEEE 802.11 standards such as: a, b, g, n and ac) that has captured the channel first and performs multi-stream downlink transmission to $STA_2$ (202); $AP^*_1$ (203) is an AP modified according to embodiments of the invention; rather than wait for the channel to clear, it performs a 2-way null towards or in the direction of $AP_2$, calculating Transmission null (205) and Reception Null (206), and serves $STA_1$ (204) after verification of various conditions outlined in following paragraphs; the role of the Transmission Null is to protect $AP_2$ from being jammed by $AP^*_1$ during the period of time in which $AP_2$ receives $ACK_2$, from $STA_2$; the role of the Reception Null is to protect $AP^*_1$ from being jammed by $AP_2$ during the periods in which $STA_1$ transmits signaling like $ACK_1$ Nulling transmitted signals requires that their channels will be known; assuming $AP_2$ is not performing explicit feedback process with $AP^*_1$, an implicit feedback is used, based on reciprocity calibration described in FIG. 5

As 802.11 multi-stream MIMO does not have an antenna reference signal, nulling can be effectively done only for the one antenna that transmits the preamble (without pre-coding), leaving the others unprotected; such a limited protection does not support multi-stream reception, but may be sufficient for single stream reception, e.g. ACK, and CTS; yet, as MRC reception of said signals is rendered deficient—only one antenna is free from jamming—there is a need to leave margin in the order of 10*log (N) dB (where N is number of AP2 antennas).

Uplink SINR estimation becomes therefore a requirement; a rough estimate can be done by monitoring AP2's Downlink MCS; since EIRP is not symmetric, the DL MCS should be compensated for the assumed DL/UP power ratio.

According to some embodiments of the present invention, the downlink transmit null may be executed while nulling AP transmits a request to send (RTS) to a station about to be served by the nulling AP, and the clear to send (CTS) is received while the uplink receive nulls are executed. Similarly, the nulling AP may send an RTS to a station which the nulling AP is about to serve, and conditions the nulling with reception of clear to send (CTS).

Figure 3:
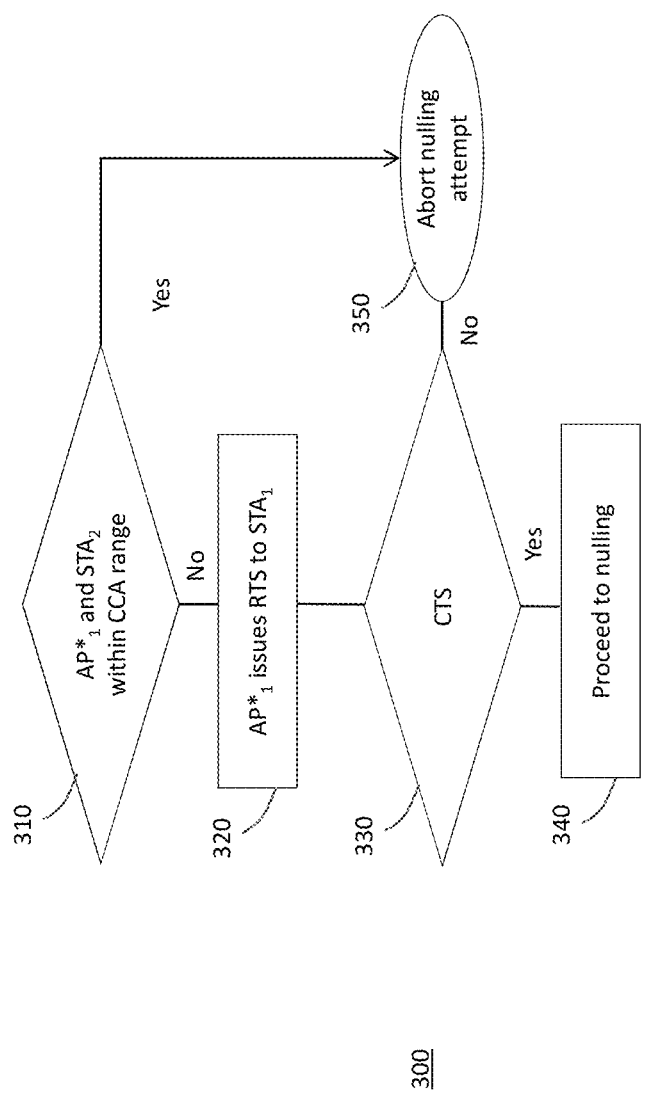
FIG. 3 show pre-requisites for a nulling based channel reuse in accordance with some embodiments of the present invention.

FIG. 3 addresses the limitation of STAs selection: Since embodiments of the invention limit themselves to the creation of a single null, and as this null is turned to a close by neighboring AP, then $STA_2$ which is served by said $AP_2$ neighbor, must be hidden from $AP^*_1$, or else the Null-base-access is not attempted, and $AP^*_1$ must wait its turn per normal 802.11 access rules; similarly, $AP^*_1$ cannot protect its $STA_1$ in the way it protects itself, from being jammed by $AP_2$, and therefore it makes sure $STA_1$ is out of $AP_2$'s range, via a RTS/CTS exchange with $STA_1$.

A possible situation where a $3^{rd}$ AP within the range of both said APs, may be blindsided by the process described above, must be addressed. Flowchart 300 summarizes one embodiment: in stage 310 $AP^*_1$ and $STA_2$ are checked whether they are within a CCA range. In case they are, the nulling attempt is aborted 350. In a case they are not, $AP^*_1$ issues a RTS to $STA_1$ 320. Then, in stage 330, if a CTS signal has been received, the $AP^*_1$ proceeds to nulling 340 and in case a CTS is not received, nulling attempt is aborted 350.

Figure 4:
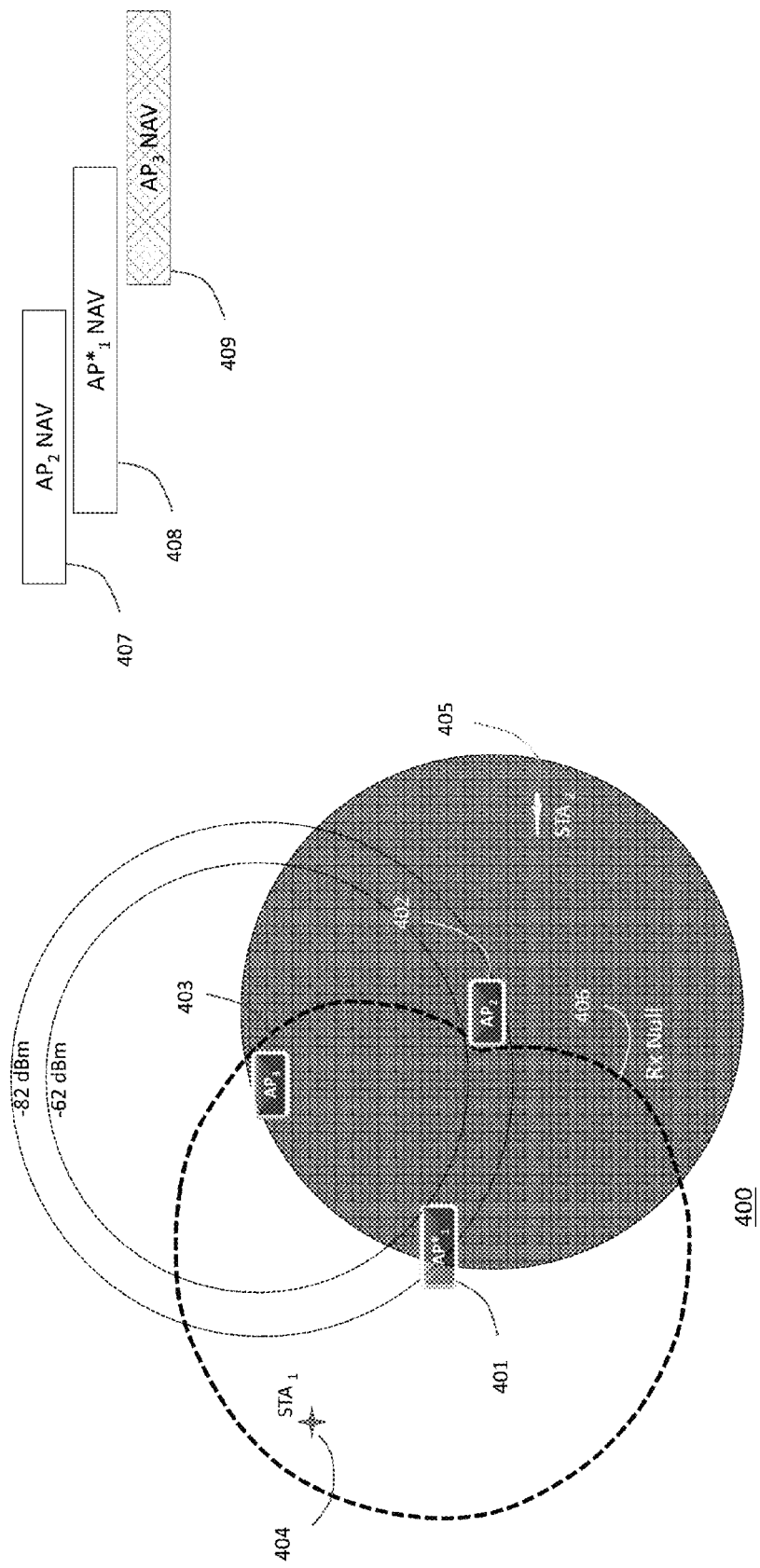
FIG. 4 illustrate additional consideration of conflicts with neighbors in accordance with some embodiments of the present invention.
Figure 7:
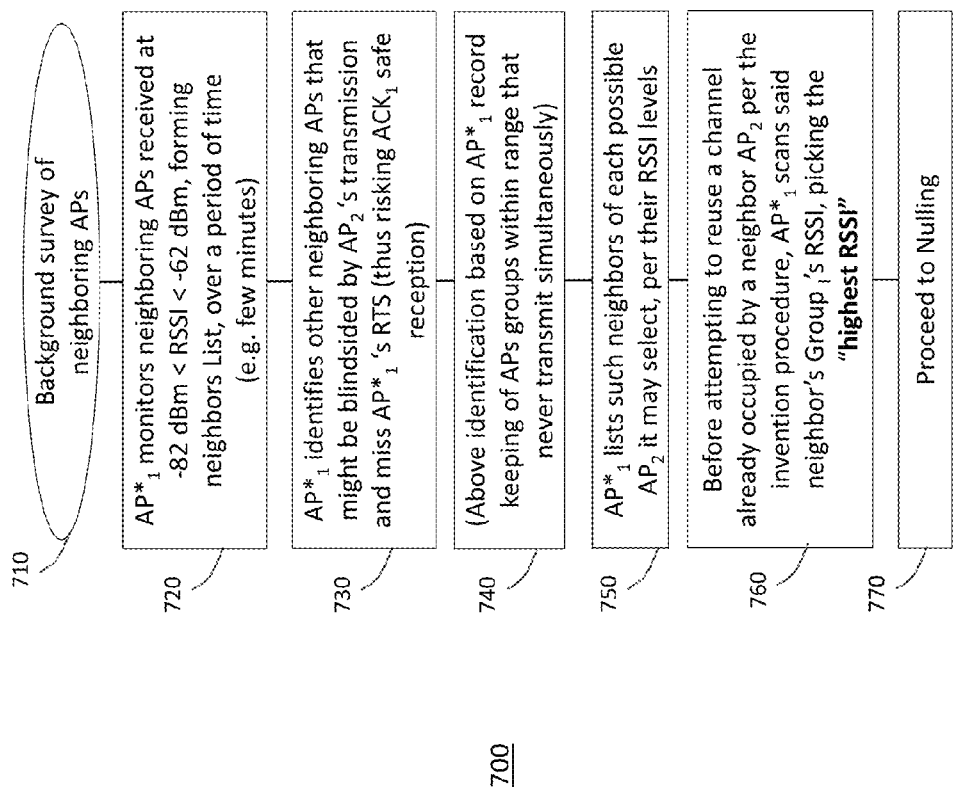
FIG. 7 illustrates additional neighbors' conflict resolution in accordance with some embodiments of the present invention.

FIG. 4 describes such a case where $AP^*_1$ 401, $AP_2$, 402 and $AP_3$ 403 are all within CCA range of each other, and more specifically, $AP_3$ is outside the energy detection range of $AP^*_1$ for example $AP_3$ and $AP^*_1$ receive each other at levels lower than −62 dBm but higher than −82 dBm; also assume that $AP_3$ receives $AP_2$ at a level equal or higher than it receives $AP^*_1$; so when $AP^*_1$ accesses the channel after $AP_2$ has, updating the original NAV 407 into extended value 408, $AP_3$ may be unable to correctly receive $AP^*_1$ Preamble, missing the fact the NAV was extended, and consequently, may access the channel while $AP^*_1$ is still active, risking $AP^*_1$ successful reception of $ACK_1$; such a damage will not occur if $STA_1$'s ACK is received at a level higher than $AP_3$'s NAV 409, which constitutes a condition addressed in FIG. 7.

According to some embodiments of the present invention, $AP^*_1$ must consider $3^{rd}$ or $4^{th}$ etc. of neighboring $AP_s$ within all within CCA range of each other, that may miss $AP^*_1$'s RTS due to current ongoing traffic, consequently accessing the channel while $AP^*_1$ is using it, potentially blocking $ACK_1$ reception.

Figure 5:
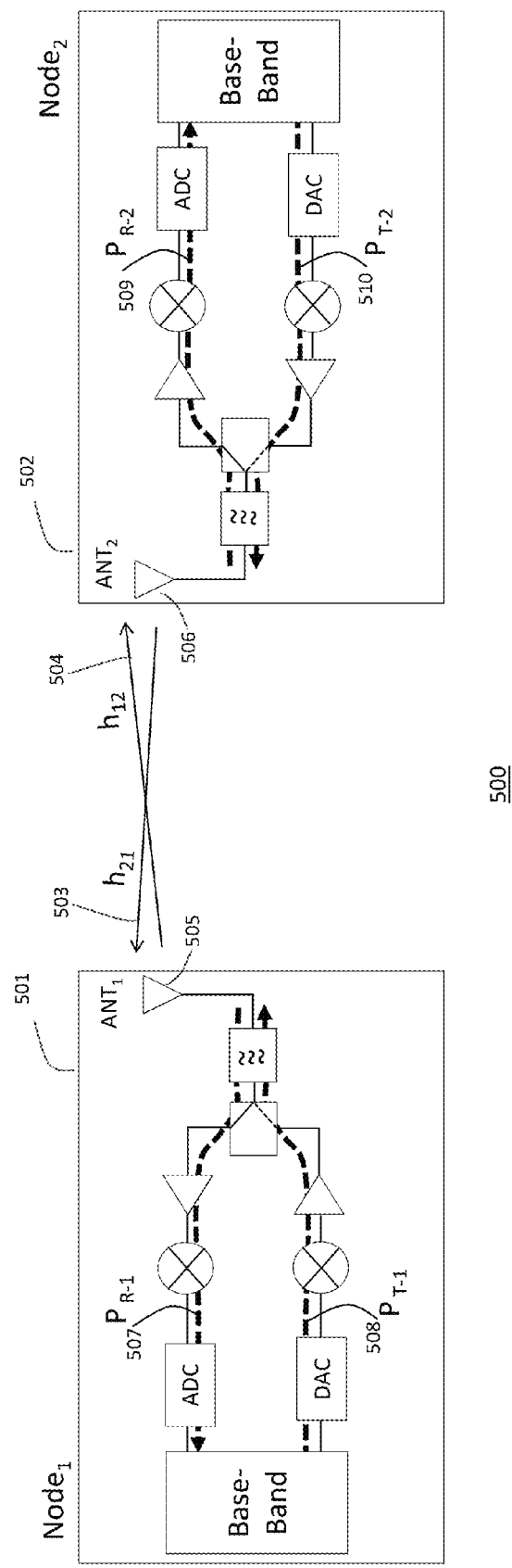
FIG. 5 illustrates channel reciprocity implicit calibration in accordance with some embodiments of the present invention.

FIG. 5 describes a process of achieving nulling AP reciprocity of uplink/downlink, thus enabling implicit feedback for nulling purposes; it is based on calibration of receiving and transmitting circuitries connected to $ANT_1$ at various Power Amplifier levels, as follows: $Node_1$ 501 Calibrates the internal receiving path $P_{R-1}$ 507 versus the internal transmitting path $P_{T-1}$ 508, registering circuitry biases at various Tx level; $Node_1$ estimates received signal at $ANT_1$ 505 transmitted from $ANT_2$ 506 of $Node_2$ 502 channel=$h_{21}$ 503+$P_{R-1}$, and Converts $P_{R-1}$ into $P^*_{T-1}$ via said calibration, substitutes $h_{21}$=$h_{12}$, and thus creating reciprocal transmit signal $P^*_{T-1}$+$h_{12}$ 504.

Figure 6:
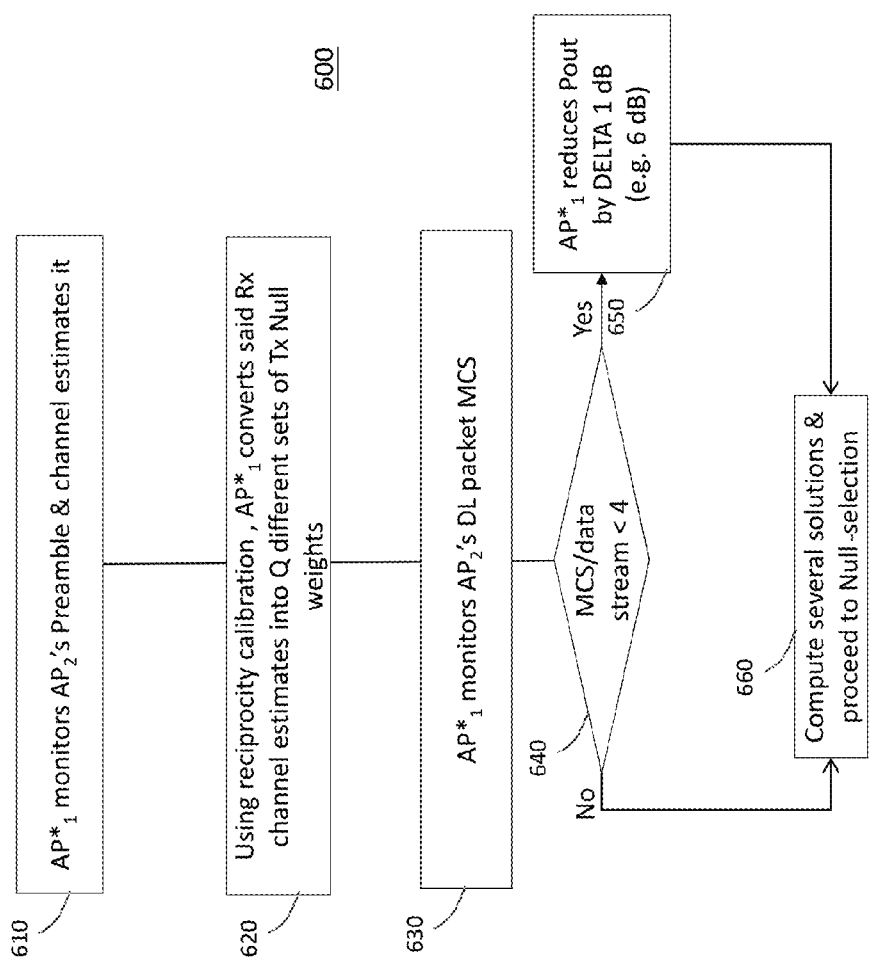
FIG. 6 illustrate a transmission null preparation process in accordance with some embodiments of the present invention.

FIG. 6 describes conditions and setup required for the preparation of an adequate Transmission Null; as indicated above, it is performed and its role is to protect from jamming one of $AP_2$'s receiving antennas, in order to allow sufficient $ACK_2$ reception's SINR; note that $AP_2$ assumed to use all N antennas for MRC based reception of $ACK_2$, and protecting only 1 of N reduced the max sensitivity by 10*log N dB, which eliminates safe reception of cell-edge STAs and therefore should not be used in for those STAs; as $STA_2$ is assumed hidden, its expected range from the center is roughly estimated via $AP_2$'s downlink MCS observed by $AP^*_1$; when Cell Edge situation is suspected, $AP^*_1$ reduces its Pout by $M_1$ dB, for instance by 10*log N dBs (e.g. 6 dB for N=4); identification of Cell Edge is based on observing said $AP_2$ Down-Link MCS, (e.g. if MCS<4).

Flowchart 600 summarizes the aforementioned procedure. In stage 610, $AP^*_1$ monitors $AP_2$'s Preamble and channel estimates it. Then, using reciprocity calibration, $AP^*_1$ converts said Rx channel estimates into Q different sets of Tx Null weights 620. In stage 630 $AP^*_1$ monitors $AP_2$'s DL packet MCS. In stage 640, the value of MCS/data stream rate is checked. In case it is smaller than 4, $AP^*_1$ reduces Pout by $DELTA_1$ (e.g. 6 dB) 650. In case not, $AP^*_1$ computes several solutions and proceeds to Null selection 660.

FIG. 7 describes the procedure that considers additional neighbors conflict like the one described in FIG. 4; $AP^*_1$ maps the conflicts potential thru history records identifying groups of 3 APs or more that see each other within CCA range, and identifies highest potential interference $RSSI_s$ that may be created by the scenario described in FIG. 4. Before attempting to access the channel occupied by $AP_2$, it will verify that the $STA_1$ it is planning to serve will be able to successfully deliver the $ACK_1$ in the presence of $RSSI_s$. ($STA_1$ RSSI>highest interfering AP RSSI, otherwise $AP_1$ does not access the channel).

According some embodiments, the Nulling AP monitors co-channel neighboring APs, registering those APs whose −62 dBm>RSSI>−82 dBm, labeling them as close-neighbors, and grading them by their RSSI.

According to some embodiments the Nulling AP identifies within the close neighbors list subgroups of APs that are within CCA range of each other, labeling them channel-sharing subgroups. The neighbors list is a list of neighboring APs and STAs within CCA range which keeps history to be checked. Close neighbors are subgroups in the Neighbors' list that are within each other's CCA range.

According some embodiments of the present invention, the identification may be carried out by registering preamble time and NAV periods from different close-neighbors which never overlap each other during the last hour.

According some embodiments of the present invention, the Nulling AP estimates the SINR of the previous ACK, and compares it with the highest RSSI amongst each of said sharing groups, and conditions the application of nulling procedure by for example the following: ACK RSSI>Highest RSSI+Margin, wherein Margin=minimum required SINR for ACK reception.

Flowchart 700 summarizes one embodiment of the invention: In stage 710 a background survey of neighboring APs is carried out. In stage 720 $AP^*_1$ monitors neighboring APs received at −82 dBm<RSSI<−62 dBm, forming neighbors List, over a period of time (e.g. few minutes). Then $AP^*_1$ identifies other neighboring APs that might be blindsided by $AP_2$'s transmission and miss $AP^*_1$'s RTS (thus risking $ACK_1$ safe reception) 730. The aforementioned identification is based on $AP^*_1$ record keeping of APs groups within range that never transmit simultaneously 740. Then, in step 750, $AP^*_1$ lists such neighbors of each possible $AP_2$ it may select, per their RSSI levels. Before attempting to reuse a channel already occupied by a neighbor $AP_2$ per an embodiment of the invention procedure, $AP^*_1$ scans said neighbor's $Group_1$'s RSSI, picking the "highest RSSI" 760. Then, $AP^*_1$ proceeds to nulling 770.

Figure 8:
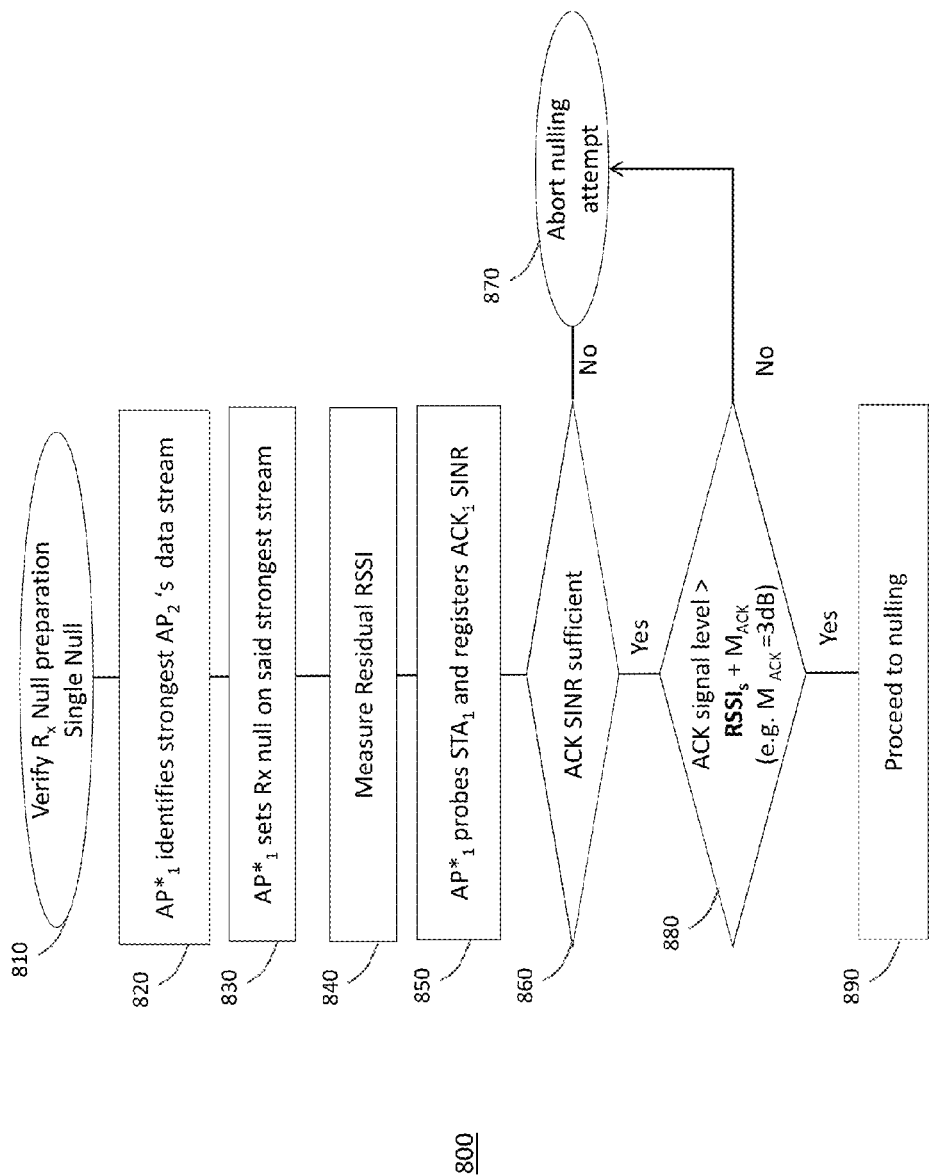
FIG. 8 illustrates reception null preparation—for a single null, in accordance with some embodiments of the present invention.

FIG. 8 describes procedure and conditions to set up a Reception Null according to one embodiment. The N antennas of $AP^*_1$ transmit up to N−1 data streams to $STA_1$ and $AP^*_1$ further tunes 1 Null toward $AP_2$'s strongest data stream (i.e., highest RSSI); as the other $AP_2$ data streams if exist, are not attenuated, the Reception Null is not very deep (e.g. 4-8 dB); with $AP_2$ RSSI of X, e.g. −70 dBm, and Reception Null depth of Y e.g. 6 dB, $STA_1$'s $ACK_1$'s RSSI must be larger than X−Y e.g. −76 dBm; (AP probes STA by a RTS with DUR=0 to determine if ACK SINR is strong enough in presence of $AP_2$ RSSI, ACK RSSI>Highest RSSI+$M_{ACK}$ (e.g. $M_{ACK}$=3 dB).

Flowchart 800 summarizes an embodiment of the procedure of $R_x$ Null preparation of a single null 810. $AP^*_1$ identifies the data stream having highest RSSI as strongest $AP_2$'s data stream 820. Then $AP^*_1$ sets Rx null on said strongest stream 830. Then, Residual RSSI is measured 840. $AP^*_1$ then probes $STA_1$ and registers $ACK_1$ SINR 850. In stage 860 the ACK SINR is checked for sufficiency. In a case it is not sufficient, the nulling attempt is aborted 870. In case it is sufficient, in stage 880 the ACK signal level is checked whether it is greater than $RSSI_s$+$M_{ACK}$ (e.g. $M_{ACK}$=3 dB). In case in is not, the nulling attempt is aborted. In case it is, $AP^*_1$ proceeds to nulling 890.

According some embodiments of the present invention, the nulling AP may receive the nulled AP's preamble and identify the destination address of the STA served by the nulled AP, and validate that said STA is not within CCA range of the nulling AP.

According some embodiments of the present invention, the nulling is conditioned on the nulling AP's reception of the MCS transmitted by a nulled AP and identified as high order MCS. Specifically, the high order MCS indicates SNR greater than 10*log(K) dB above MCS-0's SNR, where K is the number of said nulled AP's receiving antennas. Whenever the aforementioned condition is not met, or when or if the K is unknown, then the nulling AP's transmit power is reduced by 6 dB.

According some embodiments of the present invention, the nulling AP performs channel estimation of the nulled AP's preamble L-LTF field, calculates Rx null weights and uses reciprocity to create the downlink null.

According some embodiments of the present invention, the nulling AP has at least three antennas, and calculates a family of Q downlink nulls towards the said preamble of the nulled AP, and selects one of them (where Q is an integer).

According to some embodiments of the present invention, the served STA is close to Cell Edge, the power projected towards the STA intended to be served by the nulling AP $P_{STA}$, is maximized via selection of optimum solution out of said Q calculated nulls.

According to some embodiments of the present invention, a cell edge indication is derived at the nulling AP via estimating the STA's previously received SINR, for example $SINR_{ACK}$<5 dB.

According to some embodiments of the present invention, the Uplink Nulls depth are estimated by Nulling AP applying it to said Beacon transmitted by a nulled AP, and measuring the resultant RSSI after applying said null, labeling it residual RSSI.

According to some embodiments of the present invention, before uplink null is attempted, the residual RSSI is compared to the previously sent STA ACK signal level received by the Nulling AP and conditions the Null procedure for example by meeting the following: ACK Signal level−Residual RSSI>Margin, where Margin is the minimum SINR required for reception of ACK.

Figure 9:
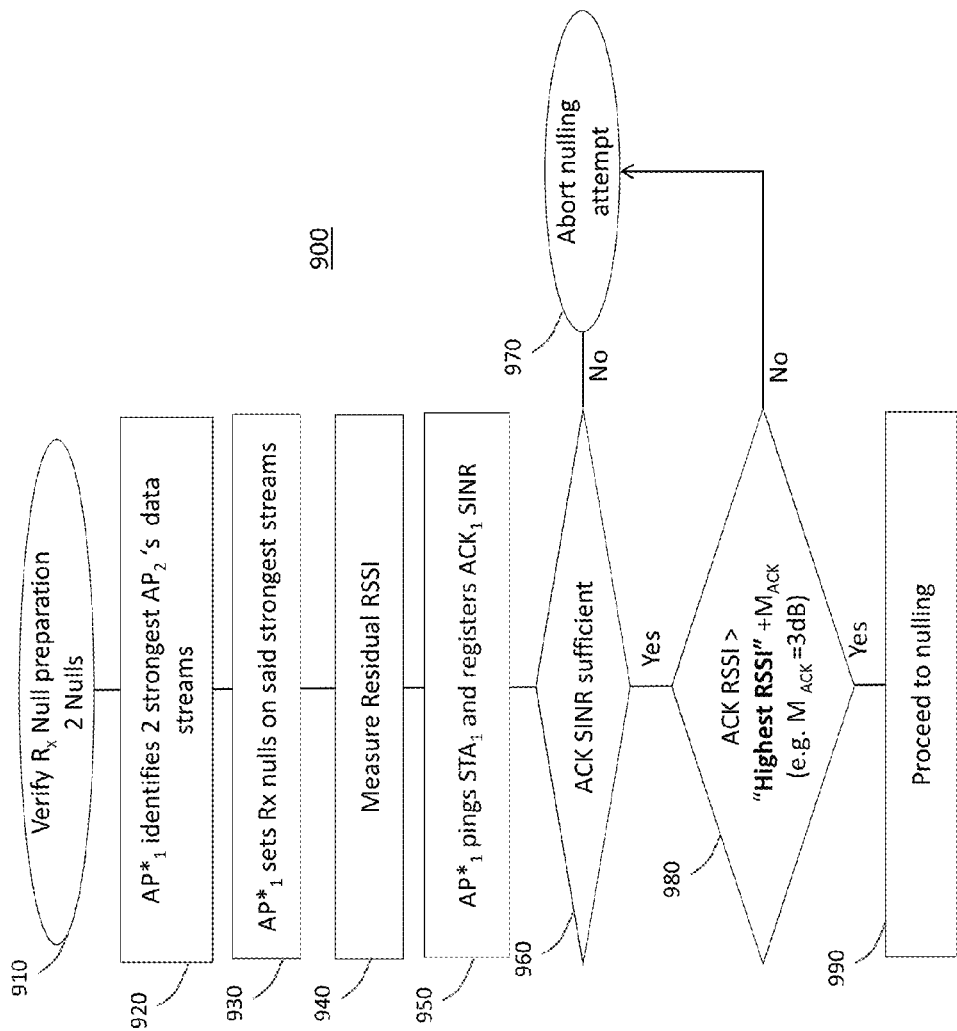
FIG. 9 illustrates two reception null separation in accordance with some embodiments of the present invention.

FIG. 9 describes procedure and conditions to set up two Reception Nulls according to one embodiment. The N antennas of $AP^*_1$ transmit N−2 data streams to $STA_1$ and $AP^*_1$ further tunes two nulls toward $AP_2$'s 2 strongest data streams (e.g., highest RSSI); as the other $AP_2$ data streams if exist, are not attenuated, the Reception Null is medium (e.g. 8-15 dB); with $AP_2$ RSSI of X, e.g. −70 dBm, and Reception Null depth of Y e.g. 12 dB, $STA_1$'s $ACK_1$'s RSSI must be larger than X−Y e.g. −82 dBm, and most cell edge $STA_1$ will be serviceable with nulling.

Flowchart 900 summarizes an embodiment of the procedure of $R_x$ Null preparation of two nulls 910. $AP^*_1$ identifies two data streams having the highest RSSI as two strongest $AP_2$'s data stream 920. Then $AP^*_1$ sets Rx null on said strongest streams 930. Then, Residual RSSI is measured 940. $AP^*_1$ then probes $STA_1$ and registers ACK' SINR 950. In stage 960 the ACK SINR is checked for sufficiency. In a case it is not sufficient; the nulling attempt is aborted 970. In case it is sufficient, in stage 980 the ACK signal level is checked whether it is greater than $RSSI_s + M_{ACK}$ (e.g. $M_{ACK}$=3 dB). In case in is not, the nulling attempt is aborted. In case it is, $AP^*_1$ proceeds to nulling 990.

According some embodiments of the present invention, the nulling AP performs channel estimation of or on each data stream transmitted by the nulled AP, during the transmission of the VHT-LTF field, and grade their power level from high to low (i.e., RSSI), labeling it as strongest, $2^{nd}$ strongest until N−1.

According some embodiments of the present invention, the nulling AP creates K−1 uplink nulls towards the K−1 respective strongest data streams, wherein K is the number its receiving antennas.

According to some embodiments, the uplink nulls depth are estimated by the Nulling AP applying it to the beacon transmitted by a nulled AP, and measuring the resultant RSSI after applying said null, labeling it residual RSSI.

According to some embodiments, before uplink null is attempted, the residual RSSI is compared to the previously STA ACK signal level received by the Nulling AP and conditions the Null procedure for example by meeting the following: ACK Signal level−Residual Jamming>Margin, where Margin is the minimum SINR required for reception of ACK.

Figure 10:
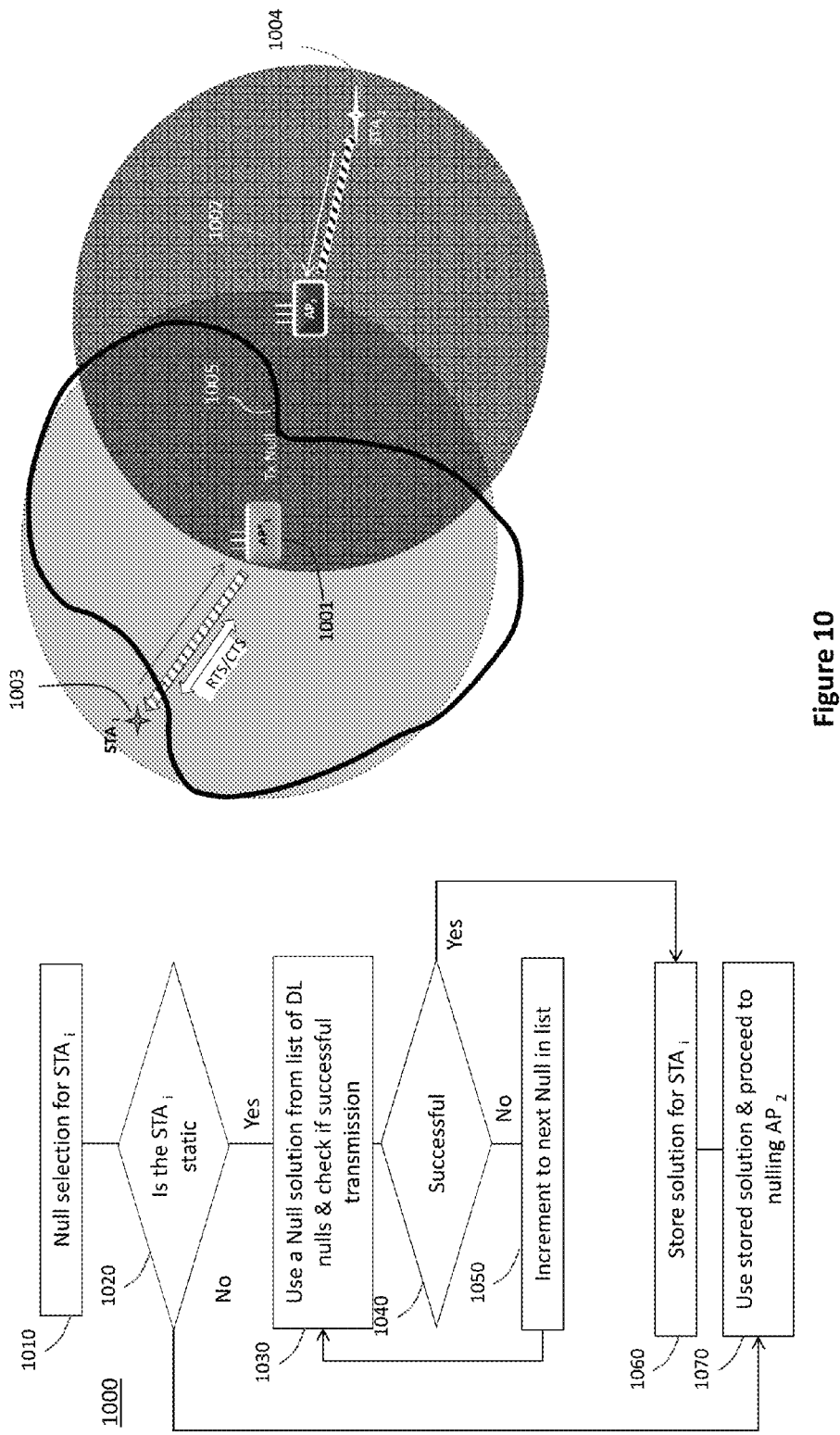
FIG. 10 is an example of Effective Isotropic Radiated Power (EIRP) modification due to null steering and null selection in accordance with some embodiments of the present invention.

FIG. 10 demonstrates the impact of transmit nulling (1005) performed by AP*1 1001 on EIRP received by $STA_1$ 1003 according to one embodiment. It is also noted that the said nulling is done with N antennas transmitting up to N−1 data streams while nulling a single antenna of a neighbor $AP_2$; such nulling would also have impact on the MIMO reception by $STA_1$, for that reason said family of Tx nulls depicted in FIG. 4 (1. Global optimization without nulling. 2. Projection of global solution onto nulling weights will yield the optimum weights.) such that $STA_1$ MIMO reception is optimized and protects $AP_2$'s reception of ACK; such optimization is done via trial and error, as long as $STA_1$ is static.

Stemming from FIG. 10 is the possibility that while $AP^*_1$ performs Tx nulling toward $AP_2$, its radiation pattern may be distorted in some cases reduce SINR experienced by $STA_1$; such SINR reduction—not anticipated by $AP^*_1$ scheduler, may cause MCS mismatch and results in packet error, defeating the purpose to the double channel access; it is therefore important to bring to bear two corrective elements: The need for imminent channel knowledge, and the need to respond to it within the few micro-seconds allowed before transmission go/no-go decision is made. It should be noted that a reduced level of EIRP may require modified modulation.

Flowchart 1000 summarizes an embodiment of this procedure. In step 1010 Null selection for $STA_i$ is carried out. In step 1020 $STA_i$ is checked whether is static. In case it is static, a null solution from a list of downlink nulls is used and checked if successful transmission. If successful, the solution may be stored for $STA_i$ 1060. Then the stored solution is used and $AP^*_1$ proceeds to nulling $AP_2$ 1070. In a case that the transmission was not successful, a counter is incremented to a next null on the list 1050 and steps 1030 and 1040 are repeated until transmission is successful so that $AP^*_1$ proceeds to steps 1060 and 1070.

In one embodiment of the present invention, the way for $AP^*_1$ to accomplish imminent channel knowledge is to form a Tx beam, then send a RTS to $STA_1$, and have it use the MRQ mechanism to inform $AP^*_1$ of its preferred MCS over MSI filed while responding via CTS.

Figure 11:
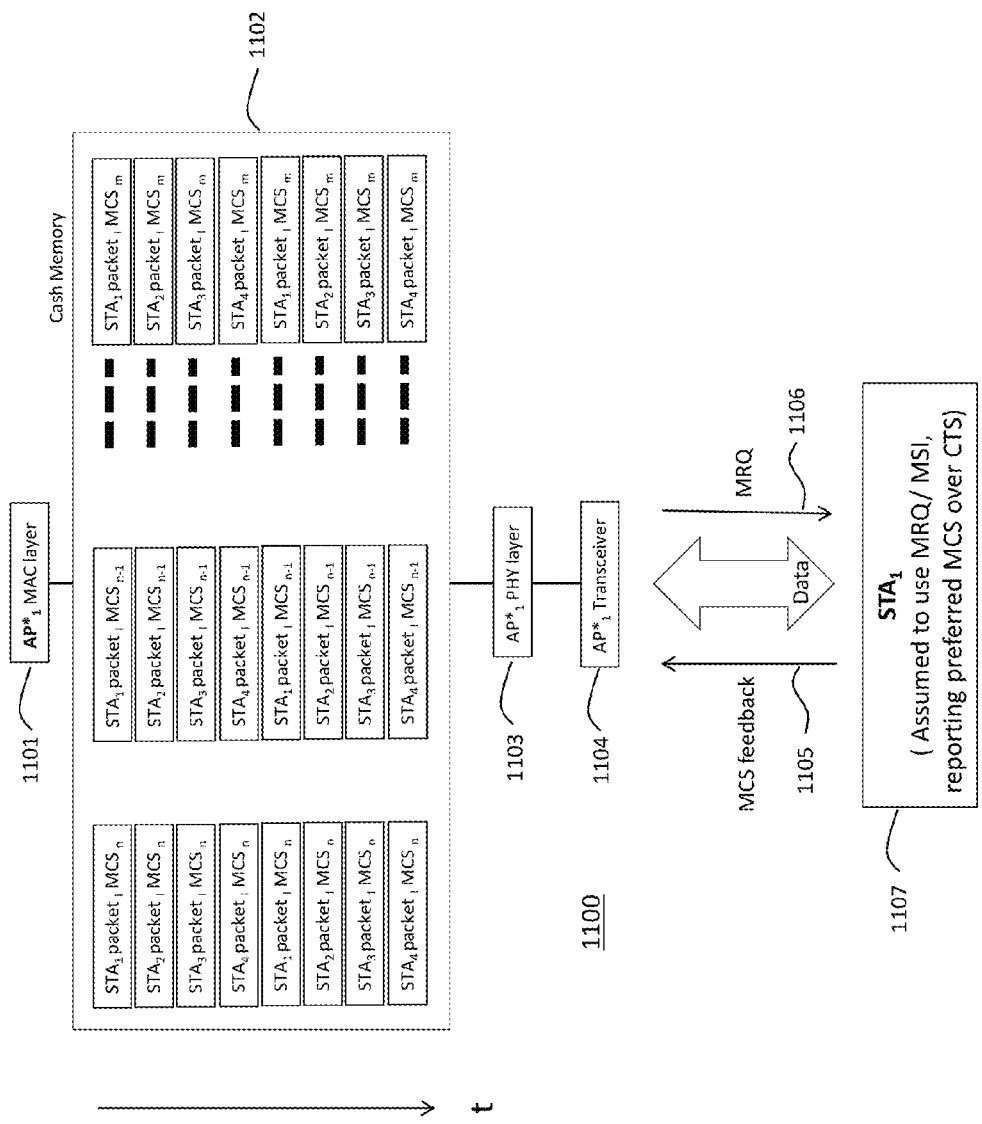
FIG. 11 illustrates ultra-fast link adaptation sequence in accordance with some embodiments of the present invention.

FIG. 11 is a block diagram 1100 illustrating an embodiment of the present invention according to which $AP^*_1$ is able to imminently transmit the packet with MCS that match the feedback received from $STA_1$ 1107 (assumed to use MRQ/MSI, reporting preferred MCS over CTS). The embodiment of FIG. 11 may be based on preparing in advance a bank of different modulation version of the packet, stored in the MAC cash memory 1102 of the MAC layer 1101 of $AP^*_1$. Following an MRQ 1106 MCS request, $STA_1$ responds with MCS feedback 1105 over MSI field, that once received back by the PHY 1103, it will be sued to point to the corresponding MCS version, and transmit it to $STA_1$ via transceiver 1104. MCS feedback does not exactly match the MCS values stored in the cache memory or other storage, the closest lower MCS version may be used.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of embodiments of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A communication node comprising:
   a plurality of antennas;
   a plurality of radio circuits configured to transmit and receive in compliance with IEEE 802.11 standard; and
   a baseband processor,
   wherein said plurality of radio circuits and antennas are located within a clear channel assessment (CCA) range of a number N neighboring nodes sharing a co-channel with the communication node,
   wherein the baseband processor is configured to set weights on the radio circuits such that spatial signatures are generated in both downlink and uplink transmissions, for allowing said communication node to access said co-channel, known by said communication node to be currently used by at least one of the N neighboring nodes, by reducing a power level of signals transmitted by said antennas, as received by said N neighboring nodes, below a CCA range power level,
   wherein said communication node is a nulling Access point (AP) and the neighboring nodes are nulled APs, and wherein the APs communicate in compliance with an IEEE 802.11 standard, wherein the nulling created by said nulling AP, are in both downlink and uplink toward to the nulled APs, and
   wherein the nulling AP performs channel estimation based on at least one field of the nulled AP's preamble, calculates Rx null weights and uses reciprocity to create the downlink Tx null.

2. The communication node according to claim 1, wherein a downlink Tx null of the nulling AP is performed in order to protect an ACK reception of the nulled AP from being jammed by the nulling AP's transmission.

3. The communication node according to claim 1, wherein an uplink Rx null of the nulling AP is performed in order to protect the nulling AP ACK reception from being jammed by the nulled AP's transmission.

4. The communication node according to claim 1, wherein the downlink transmit null is executed while transmitting request to send (RTS) to a station prior to serving by the nulling AP, and the clear to send (CTS) is received while the uplink receive nulls are executed.

5. The communication node according to claim 1, wherein the nulling AP sends a request to send (RTS) to a station prior to serving by the nulling AP, and conditions the nulling with reception of clear to send (CTS).

6. The communication node according to claim 1, wherein the nulling AP receives a preamble of the nulled AP and identifies a destination address of the station (STA) served by the nulled AP, and validates that said STA is not within CCA range of the nulling AP.

7. The communication node according to claim 1, where the nulling is conditioned on the nulling AP's reception of the Modulation Coding Scheme (MCS) transmitted by a nulled AP and identified as high order MCS.

8. The communication node in claim 7, wherein the high order MCS indicates SNR greater than 10*log(K) dB above an SNR associated with an MCS of order zero, where K is the number of receiving antennas of said nulled AP.

9. The communication node according to claim 8, wherein if said K is unknown, then the nulling AP's transmit power is reduced by 6 dB.

10. The communication node according to claim 1, wherein the nulling AP performs channel estimation of each data stream transmitted by the nulled AP, during the transmission of a Very High Throughput-Long Training Field (VHT-LTF) field, and grade a power level of the data streams, labeling the power level of the data streams as strongest, second strongest, until N−1.

11. The communication node according to claim 10, wherein the nulling AP creates K−1 uplink Rx nulls towards the K−1 respective strongest data streams, wherein K is the number of receiving antennas of the nulling AP.

12. The system according to claim 10, wherein the nulling AP has at least 3 antennas, and calculates a family of an integer number Q downlink nulls towards the said preamble of the nulled AP, and selects one of the Q downlink nulls.

13. The communication node according to claim 12, wherein the served STA is located close to a Cell Edge, the power projected by the nulling AP towards the STA intended to be served by the nulling AP $P_{STA}$, is maximized via selection of optimum solution out of said Q calculated nulls.

14. The communication node according to claim 13, wherein cell edge indication is derived at the nulling AP via estimating the said STA's previously received $SINR_{ACK}$<5 dB.

15. The communication node according to claim 14, wherein the said maximization is performed as follows: the nulling AP transmits RTS to the STA it is about to serve, using first Nulling solution out of the Q nulls solution, and if CTS is received, the Nulling AP stores the said solution for the next time it serves the said STA; and If CTS is not received, the nulling AP selects two other solutions one by one out of the Q null solutions, and repeats the RTS transmission, and if both do not result in CTS, no nulling is attempted.

16. The communication node according to claim 1, wherein the nulling AP monitors co-channel neighboring APs, registering the APs whose −62 dBm>RSSI>−82 dBm, labeling the APs whose −62 dBm>RSSI>−82 dBm as close-neighbors, and grading the APs whose −62 dBm>RSSI>−82 dBm by a corresponding RSSI level.

17. The communication node according to claim 16, wherein the nulling AP identifies within the close-neighbors list subgroups of APs that are within CCA range of each other, labeling the subgroups of APs that are within CCA range of each other as channel-sharing subgroups.

18. The communication node according to claim 17, wherein said identification is done by registering preamble time and NAV periods from different close-neighbors which never overlap each other during a last hour.

19. The communication node according to claim 18, wherein the nulling AP estimates the SINR of the previous ACK, and compares it with the highest RSSI amongst each of said sharing groups, and conditions the application of a nulling procedure by the following: ACK RSSI>Highest RSSI+ Margin, wherein Margin=minimum required SINR for ACK reception.

20. The communication node according to claim 1, wherein a depth of the receive null is estimated by the nulling AP and, wherein the receive null is applied to said beacon transmitted by a nulled AP based on the estimated depth, and wherein a measured resultant RSSI after applying said null, is residual RSSI.

21. The communication node according to claim 20, wherein before uplink null is attempted, the residual RSSI is compared to a previous STA ACK signal level received by the nulling AP and conditions the nulling by meeting the following: ACK Signal level−residual RSSI>Margin, where Margin is the minimum SINR required for reception of ACK.

22. A method comprising:
transmitting and receiving signals via a plurality of antennas and radio circuits in compliance with an IEEE 802.11 standard, located within a clear channel assessment (CCA) range of a number N neighboring nodes sharing a co-channel with the radio circuits; and
setting weights on the radio circuits such that spatial signatures are generated in both downlink and uplink transmissions for allowing an access to said co-channel, known by said radio circuits to be currently used by at least one of the N neighboring nodes, by reducing a power level of the signals transmitted by said antennas, as received by said N neighboring nodes, below a CCA range power level,
wherein said weights setting results in nulling the neighboring nodes being nulled APs, wherein the nulling is in both downlink and uplink toward the nulled APs, and
wherein the nulling AP performs channel estimation based on at least one field of the nulled AP's preamble, calculates Rx null weights and uses reciprocity to create the downlink Tx null.

23. The method according to claim 22, wherein the nulling on the transmit downlink is performed in order to protect an ACK reception of the nulled APs from being jammed by the transmitting of the signals by the radio circuits.

24. The method according to claim 22, wherein the wherein the nulling on the transmit downlink is performed in order to protect an ACK reception by the radio circuits from being jammed by the nulled AP's transmission.

25. The method according to claim 22, wherein the downlink transmit null is executed while transmitting a request to send (RTS) signal to a station about to be served by the radio circuits, and a clear to send (CTS) signal is received while the uplink receive nulls are executed.

* * * * *